Dec. 14, 1948.  J. D. BURKHOLDER, JR  2,456,489
POULTRY HOUSE

Filed April 28, 1945                                 5 Sheets-Sheet 1

J. D. Burkholder, Jr.
Attorney

Dec. 14, 1948. J. D. BURKHOLDER, JR 2,456,489
POULTRY HOUSE
Filed April 28, 1945 5 Sheets-Sheet 2

Fig. 4.

Inventor
J. D. Burkholder, Jr.
By [signature]
Attorney

Dec. 14, 1948.   J. D. BURKHOLDER, JR   2,456,489
POULTRY HOUSE
Filed April 28, 1945   5 Sheets-Sheet 3

Inventor
J. D. Burkholder, Jr.
By
Attorney

Dec. 14, 1948.  J. D. BURKHOLDER, JR  2,456,489
POULTRY HOUSE

Filed April 28, 1945  5 Sheets-Sheet 4

Inventor
J. D. Burkholder, Jr.
By
Attorney

Dec. 14, 1948.    J. D. BURKHOLDER, JR    2,456,489
POULTRY HOUSE

Filed April 28, 1945    5 Sheets-Sheet 5

Inventor
J. D. Burkholder, Jr.
By
Attorney

Patented Dec. 14, 1948

2,456,489

UNITED STATES PATENT OFFICE 2,456,489

POULTRY HOUSE

John D. Burkholder, Jr., Harrisonburg, Va.

Application April 28, 1945, Serial No. 590,758

6 Claims. (Cl. 98—32)

My invention relates to a poultry house and has particular reference to ventilating means for the same.

An important object of the invention is to provide means for opening and closing a large number of ventilator sashes for controlling ventilation, which means may be operated by a relatively small source of power.

A further object of the invention is to provide means for opening a lower ventilator sash to an inner upwardly inclined position, and a ventilator arranged near and above the ventilator sash to an outer downwardly inclined position.

A further object of the invention is to provide a lower ventilator sash and an upper ventilator arranged near the ventilator sash, which when opened, will permit of fresh air entering the house and deflected upwardly to avoid a draft, while the warm or stuffy air within the house discharges from the open ventilator and which will prevent wind blowing directly into the building and will also exclude rain or snow.

A further object of the invention is to provide automatic temperature control means which will set the motor into operation for closing and opening the ventilator elements, for maintaining the temperature substantially constant.

A further object of the invention is to provide operating means for opening and closing a large number of ventilator sashes in a long building, by means of a long rock shaft, actuated in a manner to prevent the same tending to be twisted.

A further object of the invention is to provide ventilator elements arranged in a plurality of stories in the house, and operating the ventilator elements in one story and the ventilator elements in the other story from the first set of ventilator elements.

A further object of the invention is to provide ventilator sashes, which are auxiliary to the main ventilator sashes, for affording added or emergency ventilation.

A further object of the invention is to provide means for preventing the auxiliary ventilator sashes being opened while the main ventilator sashes are closed, which means is adjustable to permit the auxiliary ventilator sashes being opened while the main ventilator sashes are closed.

A further object of the invention is to provide winding means for opening a number of ventilator sashes in different stories of the house, which means is actuated by a common rotary element.

Other objects and advantages of the invention will be apparent during the course of the following description.

In the accompanying drawings forming a part of this application and in which like numerals are employed to designate like parts throughout the same.

Figure 6:
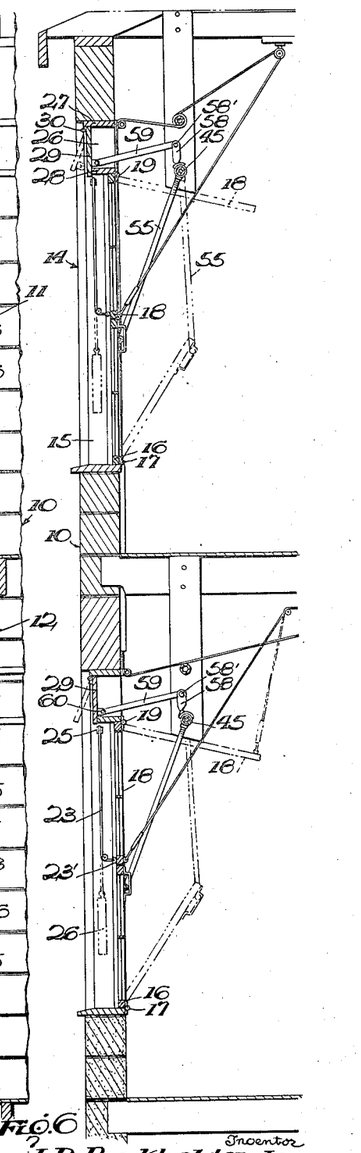
Figure 6 is a vertical section taken on line 6—6 of Figure 5.

In the drawings wherein for the purpose of illustration is shown a preferred embodiment of my invention, the numeral 10 designates a poultry building which may be a long building, such as from 150 to 200 feet long. This building has an upper story 11 and a lower story 12 and an attic 13. Each story is provided upon one side of the building with a plurality of ventilator units or windows 14. In each story these ventilator units 14 are arranged in spaced relation in a horizontal group, and the ventilator units in the upper and lower stories are spaced and are arranged in vertical companion units or pairs, the ventilator units in the vertical companion unit or pair being preferably in alignment. Each ventilator unit 14 comprises a window frame 15, in which are mounted a lower pair of ventilator sashes 16, hinged at their bottoms to the frame 15 by hinges 17. These lower ventilator sashes 16 are vertical when closed and swing inwardly to open, Figure 6, and assume vertically inclined open positions. Arranged within each frame 15 of the ventilator unit and above the lower ventilator sashes 16 are upper ventilator sashes 18, connected at their tops to the frame 15 by hinges 19. The upper ventilator sashes 18 are arranged in pairs to correspond to the pair of lower ventilator sashes 16 in the vertical companion group. Each upper pair of ventilator sashes 18 are vertical when closed and open inwardly, Figure 6, and are substantially horizontal when in the open position.

Each lower pair of ventilator sashes 16 may be equipped with adjustable latches or stops 20, pivoted to the same at their tops and near their longitudinal centers by adjustable bolts 21, and adapted to be clamped to the lower ventilator sashes 16 in the selected adjusted position. When the latches 20 are vertically arranged, they project over the bottom ends of the upper pair of ventilator sashes 18, and hence the upper ventilator sashes cannot be moved inwardly to the open position before the lower ventilator sashes 16 in the companion vertical group are open. These latches 20 may be adjusted to a horizontal position below the bottoms of the upper ventilator sashes 18 and this will permit of the opening movement of the upper ventilator sashes independently of the lower ventilator sashes 16 in the same vertical group. Each pair of upper ventilator sashes 18 is closed by gravity, and to render this closing operation more positive, a flexible element 23 is connected with each upper ventilator sash 18 near its lower or free end, as shown at 23', and passed about a lower pulley 24, fixed in the frame 15, and then over upper pulleys 25, fixed in the frame 15, and carries a suitable weight 26. This weight operates within the box 25 of the frame 15.

Each frame 15 is provided above and adjacent to the tops of the upper ventilator sashes 18 with ventilator frames 26, having their opposite sides open. Each frame 26 includes a top 27 and a bottom 28. A ventilator 29 is provided for each frame 26, and is hinged at its top to the top 27, as shown at 30. Each ventilator 29 opens outwardly and, when in the open position, it is vertically inclined downwardly. When in the closed position, the ventilator 29 has its bottom projecting below the bottom 28, and when the ventilator 29 is in the open position, its bottom overlaps the bottom 28, Figure 6, thus preventing wind from blowing directly through the frame 26 into the building. The ventilators 29 in each ventilator unit are positively opened and closed and move in unison with the lower ventilator sashes 16, in such unit.

Figure 1:
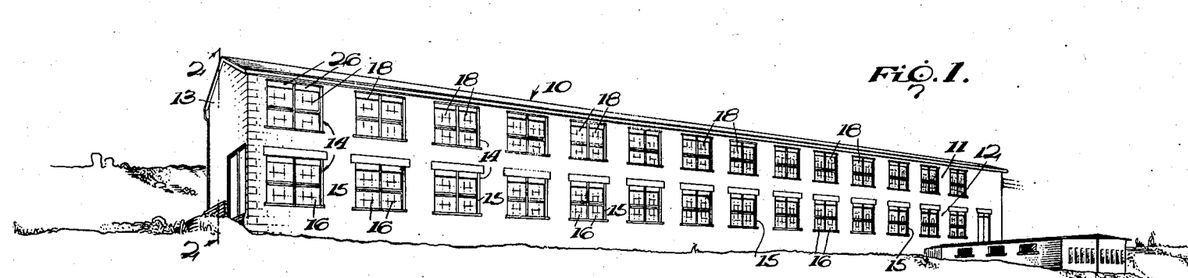
Figure 1 is a perspective view of a poultry building having my ventilating means applied thereto.
Figure 2:
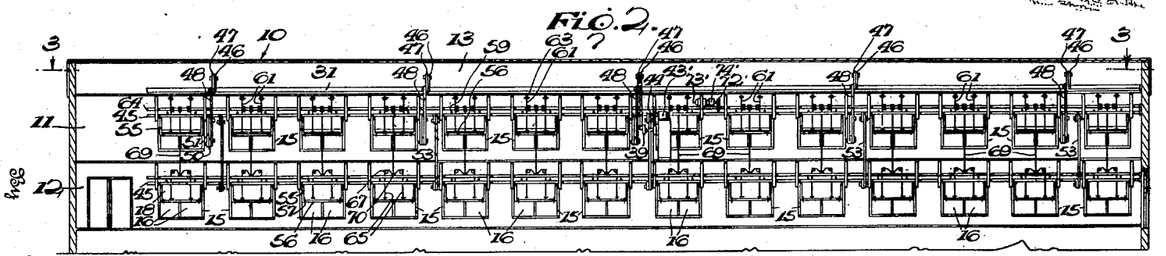
Figure 2 is a central vertical longitudinal section taken on line 2—2 of Figure 1.
Figure 3:
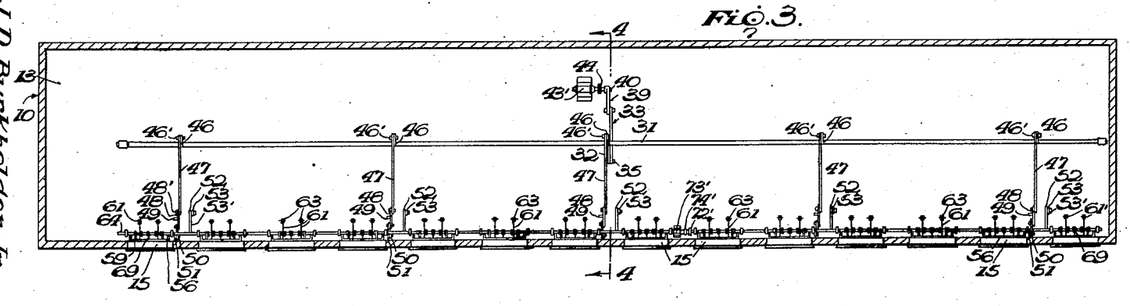
Figure 3 is a horizontal section taken on line 3—3 of Figure 2.
Figure 4:
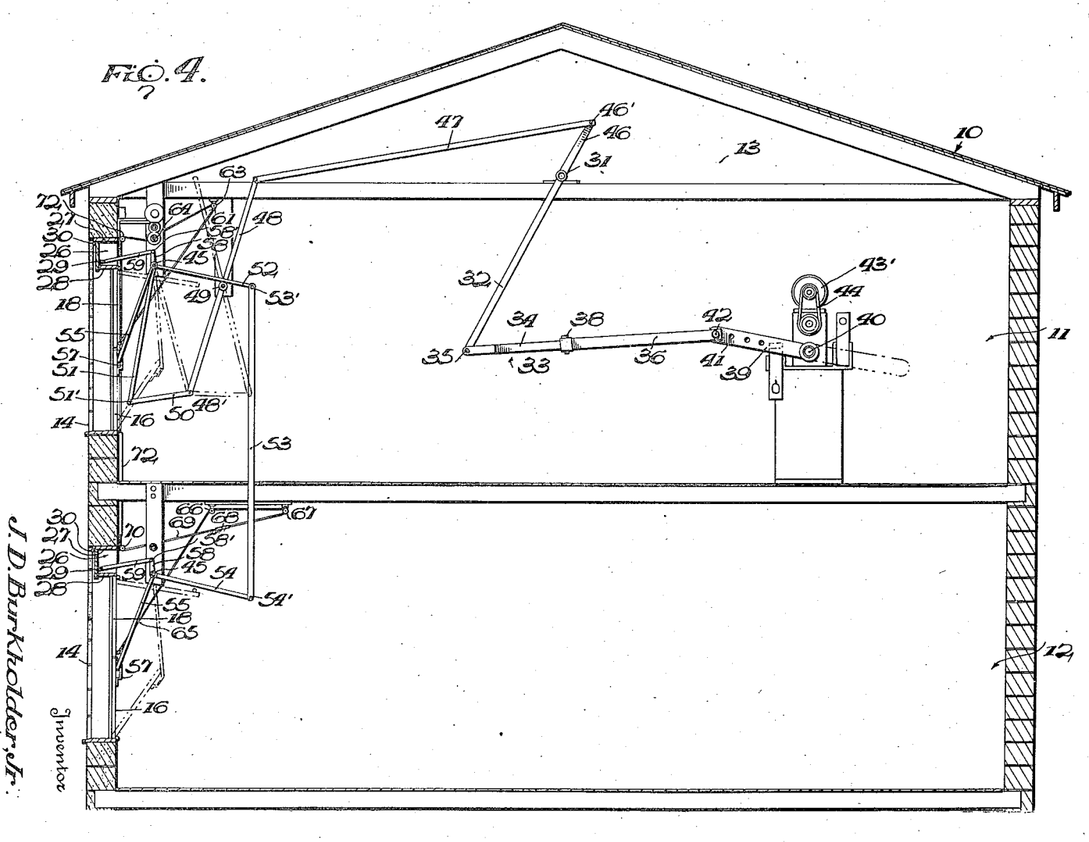
Figure 4 is a transverse vertical section taken on line 4—4 of Figure 3.
Figure 5:
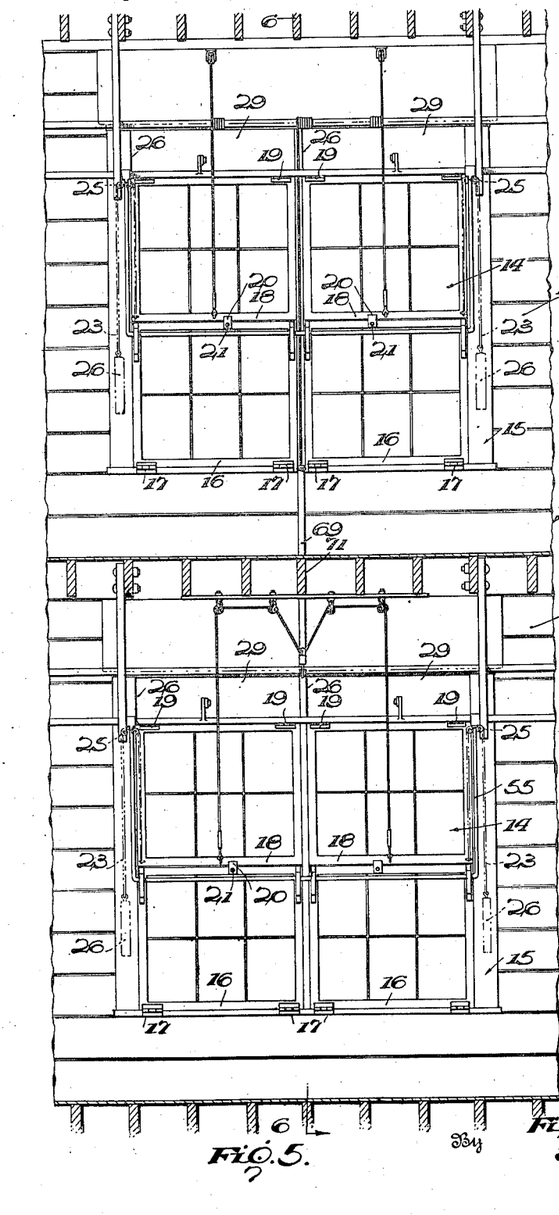
Figure 5 is a view similar to Figure 2, upon an enlarged scale, parts omitted, showing companion upper and lower ventilator units or windows.

Arranged within the attic 13 is a horizontal longitudinal shaft 31, preferably arranged at the transverse center of the building 10. This shaft 31 is mounted in suitable fixed bearings, and extends throughout substantially the entire length of the building 10. This shaft is preferably tubular and is sufficiently large or heavy so that there will be no tendency for it to twist. Rigidly connected with the rock shaft 31, near its center, Figure 4, is a long depending lever 32, for increasing the leverage. Pivotally connected with the lower end of the lever 32 is a connecting rod or link 33, Figures 4 and 8. The connecting rod or link 33 is longitudinally adjustable and includes a tubular rod or link section 34, pivotally connected with the lower end of the lever 32 at 35. The link or rod section 34 is slidable within a companion tube 36 and has spaced apertures 37 for receiving a pin 38. The rod or link section 34 may be longitudinally adjusted within the tube 36 and locked thereto by the pin 38 in the selected adjusted position. The numeral 39 designates an operating crank rigidly mounted upon a shaft 40 and rotating with and about the shaft. The crank 39 has spaced apertures 41 spaced the same distances as the apertures 37, and the apertures 41 receive a pin 42, passing through apertures 43 formed in the tube 36. The operating crank or arm 39 turns clockwise, Figure 4, with the shaft 40, and this shaft 40 is driven by a motor 43, through the medium of suitable speed-reducing gearing 44. By having the connecting rod or link 33 adjustably connected with the operating crank or arm 39, the effective throw of the crank 39 for opening the ventilator elements may be adjusted, and by having the rod or link 33 longitudinally adjustable, the operating crank or arm 39 will properly close the ventilator elements when its opening throw is thus adjusted.

Figure 7:
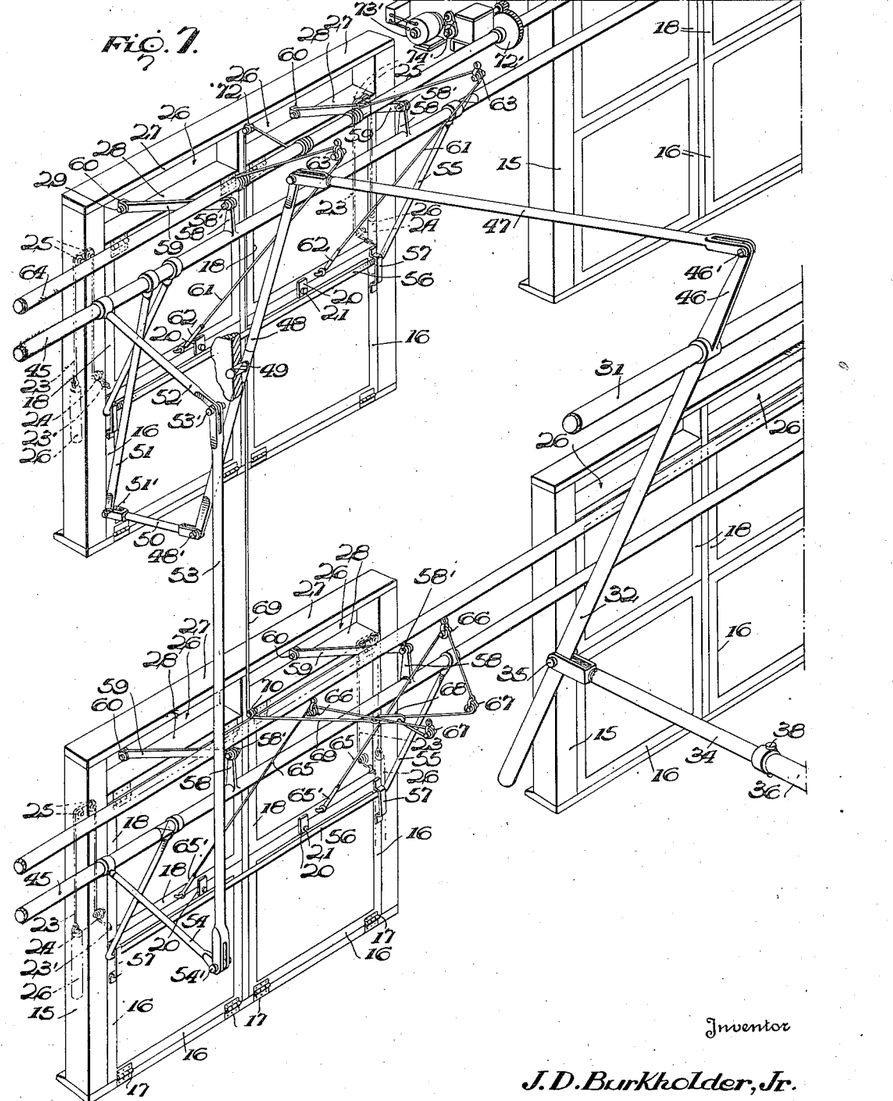
Figure 7 is a perspective view of the companion upper and lower ventilator units removed, and the operating unit.

Disposed in each story 11 and 12 near the tops of the upper sash ventilators 18 is a rock shaft 45, extending throughout substantially the entire length of the building 10, and journalled in suitable fixed bearings. This rock shaft is of smaller diameter than the rock shaft 31, and the rock shaft 45 might tend to twist if power were applied thereto at one point only. In order to avoid any twisting tendency, the heavy rock shaft 31 is provided at intervals, such as 30 feet apart, with upstanding cranks 46, rigidly secured thereto. Pivoted to each crank 46, at 46', is a connecting rod or link 47, Figures 4 and 7, pivoted to the upper end of a lever 48. These levers 48 are also arranged 30 feet apart and in transverse alignment with the cranks 46. The lever 48 is pivotally supported between its ends by a fixed pivot 49. The lower end of each lever 48 is pivotally connected at 48' with a connecting rod or link 50, in turn pivotally connected with a crank 51, as shown at 51'. The crank 51 is rigidly mounted upon the upper rock shaft 45. A number of horizontal cranks 52, corresponding in number and arrangement to the cranks 51, are rigidly mounted upon the upper rock shaft 45. A depending connecting rod or link 53 is pivotally connected with the crank 52 at 53', and extends downwardly into the lower story 12, and is pivotally connected at 54' with a horizontal crank 54 rigidly mounted upon rock shaft 45. It is thus seen that the upper and lower rock shafts 45 turn in unison. It is also apparent that a lever 48 is arranged adjacent to each upper ventilating unit 14 and is operatably connected with the upper and lower rock shafts 45 adjacent to the ventilator units in each vertical group or pair.

Each rock shaft 45 is provided adjacent to each ventilator unit of its story with a U-shaped operating loop or crank 55, rigidly secured thereto and depending therefrom. The horizontal end 56 of this operating loop operates within vertical elongated straps or loops 57, rigidly attached to the sides of the pairs of ventilator sashes 16. These loops 57 are arranged adjacent to the tops of the lower ventilator sashes 16 and terminate at the tops of the same. When the operating loop or crank 56 is swung inwardly, the corresponding pair of ventilator sashes 16 move inwardly to the open position.

Connected with each rock shaft 45, adjacent to each ventilator unit, are upstanding cranks 58, rigidly secured thereto, and pivotally connected at 58' with links or rods 59, in turn hinged to the ventilators 29, as shown at 60. When the lower ventilator sashes 16 in each ventilator unit is swung downwardly or inwardly, the corresponding ventilators 29 are simultaneously swung upwardly and outwardly.

The upper ventilator sashes 18 of each ventilator unit are raised by flexible elements or ropes 61, attached thereto by devices including a yieldable breakable element 62, such as a section of rubber. This rubber is sufficiently strong so that it will not break under normal operating conditions, but will yield so that the ventilator sashes will close tightly but will break if excessive pull is applied thereto, thus preventing the upper ventilator sashes being broken. The ropes 62 pass over pulleys 63 and then extend to a rotary shaft 64, suitably mounted within the upper story of the building and extending throughout substantially its entire length. The ropes 62 are attached to the rotary shaft 64 and are wound thereon. When the shaft 64 is turned in one direction, the upper ventilator sashes 18 in the upper story will be swung inwardly and opened, and when the shaft is turned in an opposite direction, the ropes 61 will be payed out and such ventilator sashes 18 will be lowered and returned to the closed position. There is a pair of ropes 61 for each pair of ventilator sashes in the upper story. Each pair of upper ventilator sashes in the lower story is raised by flexible elements or ropes 65, attached to their lower ends by devices 65' embodying sections of rubber. These devices 65 are identical with the devices 62 and are used for the same purpose. The ropes 65 pass upwardly and extend over pulleys 66 and then extend further inwardly and pass over pulleys 67, and then converge outwardly toward the ventilator unit and are connected with a link 68 or the like, attached to a suitable rope 69, passing over a pulley 70. These several pulleys are suitably supported, as is obvious. The rope 69 then passes upwardly through a vertical pipe 72 extending between the upper and lower story and then over a pulley 72, and then extends to the shaft 64 and is wound upon this shaft. It is thus apparent that the upper and lower sashes 18 of each vertical pair of ventilator units at the upper and lower floors are moved in unison for opening and closing. There is a pair of ropes 65 for each pair of ventilator sashes 18 in the lower story. The shaft 64 has a gear 72' rigidly mounted thereon driven by a motor 73', through the medium speed-reducing gearing 74'.

The operating arm 39 is turned clockwise, Figure 4, and Figures 8 to 12 inclusive, by means of the motor 43'.

Figure 9:
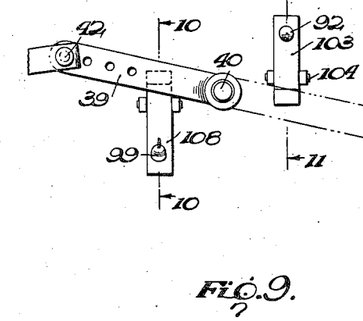
Figure 9 is a side elevation of the operating crank.
Figures 10, 11:
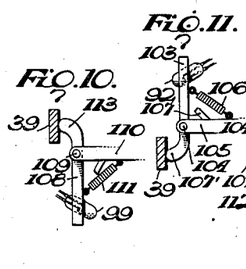
Figure 10 is a transverse section taken on line 10—10 of Figure 9, the operating crank being in the position to open the mercury switch.
Figure 11 is a similar view, taken on line 11—11 of Figure 9, the operating crank being in the position to open the mercury switch.
Figure 12:
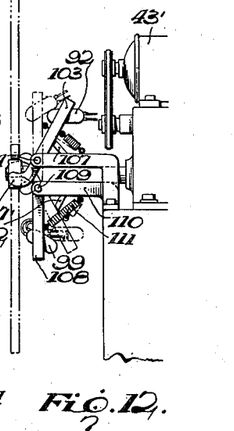
Figure 12 is an end elevation of the operating crank, the associated elements being in side elevation, and, Figure 13 is a diagrammatic view of a circuit for controlling the operation of the motor which drives the operating crank.
Figure 13:
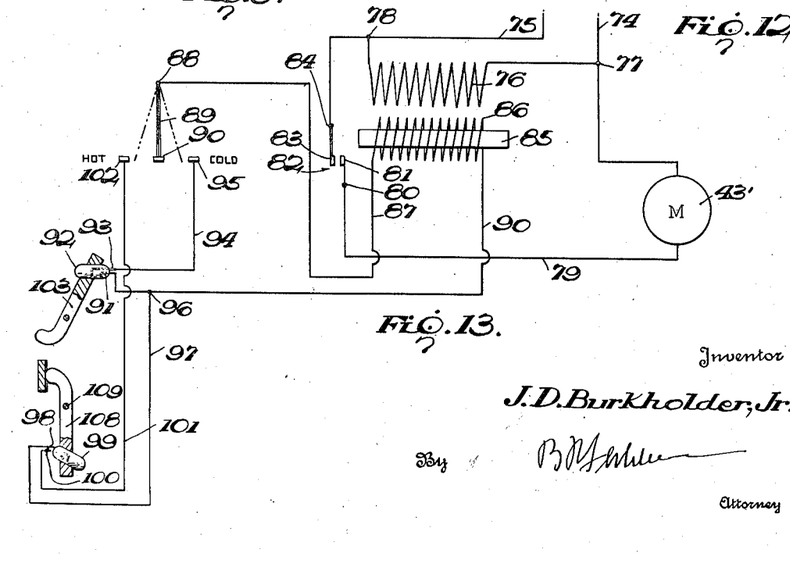

As more clearly shown in Figure 9, the numeral 74 designates one lead of an alternating current circuit and 75 the other lead. A primary coil 76 of an induction coil is connected with the lead 74, at 77, and to the lead 75 at 78. The lead 74 is connected with one terminal of the motor 43' and a wire 79 is connected with the opposite terminal of the motor, and is connected at 80 with a stationary contact 81 of a switch or relay 82, including a movable contact 83, which is biased open and connected with lead 75 at 84. A solenoid is provided to move contact 83 into engagement with contact 81, and this solenoid includes a core 85 and a coil or winding 86, having a current induced therein from the winding 76. One end of the secondary winding 86 is connected with a wire 87, connected at 88 with a bi-metal thermostatic element 89, carrying a double-ended contact 90. The thermostatic element 89 is acted upon by the heat within the building 10 and may be arranged in any suitable position therein. The opposite end of the winding 86 is connected with a wire 90, and this wire is connected with one terminal 91 of a mercury switch 92. The other terminal 93 of this mercury switch is connected with a wire 94, connected with a cold stationary contact 95. The wire 90 is connected at 96 with a wire 97 connected with one terminal 98 of a mercury switch 99, the other terminal 100 of which is connected with a wire 101, connected with a cold stationary contact 102. The movable contact 90 is arranged between the contacts 95 and 102 and may disengage both of them or alternately engage either. Each mercury switch is of the conventional type embodying a glass envelope containing mercury which receives the down-turned ends of the terminals therein for forming an electrical connection between them when the mercury switch is horizontal, and which breaks the electrical connection between the terminals when the mercury switch is inclined so that the mercury rolls away from and out of contact with the down-turned ends of the terminals. The mercury switches 92 and 99 are arranged upon that side of the operating crank or arm 39 remote from the connecting rod or link 33, so as not to be engaged thereby. The mercury switch 92 is rigidly mounted upon a lever 103, pivoted at 104 upon a stationary support 105. The lever 103 is automatically swung to an inclined position by a retractile coil spring 106 and a stop 107 is provided to limit the swinging movement of the lever 103 by the spring 106. The mercury switch is transversely inclined with respect to the lever 103, and when this lever is vertical, the mercury switch 92 is inclined and is open, and when the lever 103 is moved by the spring 106 to the inclined position, the mercury switch 92 is horizontal and closed. At its lower end, the lever 103 has a lateral extension 107', arranged in the path of travel of the operating crank or arm 39. The lever 103 is disposed upon one side of the shaft 40, while a corresponding lever 108 is arranged upon the opposite side of the shaft 40. The lever 108 is pivoted at 109 to a fixed support 110, and is moved from the vertical position to the inclined position by a retractile coil spring 111. A stop 112 limits the swinging movement of the lever 108 by the spring. The lever 108 has the mercury switch 99 rigidly mounted thereon and this mercury switch is transversely inclined with respect to the lever 108, so that the mercury switch is inclined and open when the lever 108 is vertical and horizontal and closed when the lever is inclined. The lever 108 is provided at its upper end with a lateral extension 113, arranged in the path of travel of the operating crank or arm 39. The levers 103 and 108 are pivoted to swing in a plane at right angles to the path of travel of the operating crank or arm 39. Due to the action of the springs 106 and 111, the mercury switches 92 and 99 are biased closed.

Figure 8:
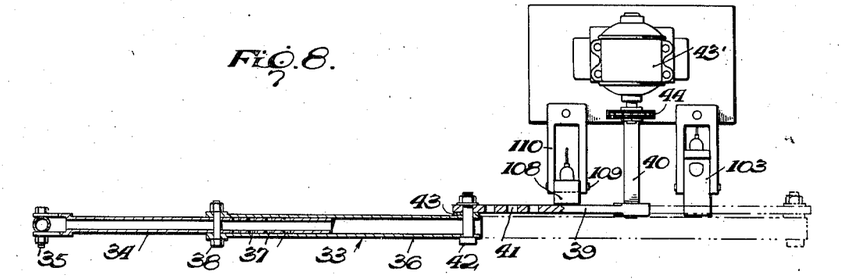
Figure 8 is a plan view of the operating crank and associated elements, parts in section.

The operation of the apparatus is as follows:

The operating arm or crank 39 rotates clockwise, Figures 4, 8 and 9, as stated. When the crank or arm 39 is in the generally horizontal position to the left, Figures 4 and 9, the ventilator sashes 16 and the ventilators 29 are closed. The lever 108 is now being held in the vertical position by the operating crank 39 and the mercury switch 99 is open. The lever 103 is now inclined and the mercury switch 92 is closed. At this time the thermostatic element 89 is in the intermediate position and is disengaging both contacts 95 and 102, and the circuit for the motor 43 is open. Since the ventilator sashes and ventilators are closed, when overheating occurs, the thermostatic element 89 will function and the contact 90 will engage contact 95. When this occurs, the circuit connected with the winding 86 will be closed and current will be induced in the winding 86, the circuit being made from one end of the winding 86, through wire 90, terminal 91, terminal 93, wire 94, contact 95, contact 90, thermostatic element 89, wire 87 and back to winding 86. When this occurs, the solenoid is energized and switch 82 is closed, which closes the motor circuit. In this motor circuit, current passes through wire 74, motor 43, wire 79, contact 84, contact 83, and back to wire 75. The motor is thus set into action and continues to drive until the crank 39 is moved for substantially 180° to assume the position to the right. When this occurs, the crank 39 engages lever 108 and holds it in the vertical position, whereby mercury switch 92 is opened and the motor circuit opened and the motor stopped. Lever 108 is now moved by its spring to the inclined position and its mercury switch is closed. The ventilator sashes 16 and the ventilators 29 are now open and the building begins to cool and when the temperature drops sufficiently, the thermostatic element 89 will first disengage contact 95, then assume an intermediate position and then engage contact 102. When contact 90 engages contact 102, a circuit will be closed to drive the motor. Current is again induced in the winding 86, which is then in a closed circuit, including wire 90, wire 97, terminal 98, terminal 100, wire 101, contact 102, contact 90, and wire 87 back to the winding 86. The solenoid is energized and the motor circuit is then closed at contacts 81 and 83. When the crank 39 again reaches the position to the left, Figure 9, such crank holds the arm 108 in the vertical position and mercury switch 99 is opened. The motor again stops and the ventilator sashes 16 are open and the ventilators 29 are open, and mercury switch 92 is closed. The cycle of operation is then repeated. It may be desired to provide additional ventilation and this may be effected while the lower ventilator sashes are opened, and the stops 20 projecting above the same. This is effected by starting the motor 73 so that the shaft 64 is rotated and the several ropes wound thereon for raising the upper sashes 18. The operation of the motor 73 is controlled separately from the motor 43. The sashes 18 cannot be opened when the lower ventilator sashes 16 are closed and the stops 20 project above the same. However, when the stops 20 do not project above the lower ventilator sashes 16, the upper ventilator sashes may be raised or opened while the lower ventilator sashes are closed. The arrangement of the lower ventilator sashes 16 permits of the entrance of fresh air into the story near the floor without creating a draft and while the fresh air is thus entering the lower portion of the room, the foul or heated air is leaving the room near its top through the ventilators 29. The upper ventilator sashes 18 provide for additional or emergency ventilation.

It is to be understood that the form of my invention herein shown and described is to be taken as a preferred example of the same and that various changes in the shape, size, and arrangement of parts may be resorted to without departing from the spirit of my invention or the scope of the subjoined claims.

Having thus described my invention, what I claim is:

1. A poultry house having upper and lower stories, a plurality of pairs of lower ventilator sashes for each story arranged at one side of the house; means to pivotally support each pair of ventilator sashes; a plurality of pairs of ventilators for each story arranged above the ventilator sashes and at the same side of the house; the pairs of ventilator sashes of the two stories and the pairs of ventilators of the two stories forming vertical units, a generally horizontal rock shaft extending longitudinally within the upper story adjacent to the pairs of ventilator sashes; depending cranks corresponding in number and arrangement to the pairs of ventilator sashes in the upper story and connected with such pairs of ventilator sashes and mounted upon the rock shaft, pairs of cranks connected with the rock shaft and corresponding in number and arrangement to the ventilators of the upper story; means connecting the pairs of cranks with the pairs of ventilators, generally vertical cranks mounted upon the rock shaft, and depending therefrom and arranged in spaced relation thereto, generally vertical operating levers pivotally supported between their ends and corresponding in number and arrangement to the generally vertical cranks, means connecting the lower ends of the generally vertical operating levers with the generally vertical cranks, a main operating rock shaft extending longitudinally within the upper story, generally vertical cranks mounted upon the main operating rock shaft, links connecting the last-named generally vertical cranks and the upper ends of the operating levers, a lever mounted upon the main operating rock shaft and longer than the cranks carried thereby, means to move the last-named lever, a generally horizontal rock shaft extending longitudinally within the lower story near the ventilator sashes; generally vertical cranks mounted upon the last-named rock shaft and corresponding in number and arrangement to the pairs of ventilator sashes of the lower story and connected therewith; pairs of generally vertical cranks mounted upon the last-named rock shaft and corresponding in number and arrangement to the pairs of ventilators of the lower story, means connecting the last-named cranks and last-named ventilators, a plurality of generally horizontal cranks mounted upon the first-named rock shaft of the upper story, a plurality of generally horizontal cranks mounted upon the rock shaft of the lower story and corresponding in number and arrangement to the generally horizontal cranks of the upper story; and links connecting the generally horizontal cranks of the upper story with the generally horizontal cranks of the lower story.

2. A poultry house having a room, a ventilator sash arranged near the bottom of the room; means to pivotally support the ventilator sash near its bottom, so that it may be swung vertically inwardly to a vertically inclined position; an upper ventilator arranged above the ventilator sash; means for pivotally supporting the upper ventilator near its top so that it may be swung vertically outwardly to a downwardly inclined position; a guide element attached to the ventilator sash and having a vertically elongated opening, a substantially horizontal rock shaft arranged above the ventilator sash; a depending crank mounted upon the rock shaft and having a part arranged within the elongated opening of the guide element, a second crank mounted upon the rock shaft and projecting above the same, a link pivotally connected with the second crank and with the upper ventilator, and means to turn the rock shaft.

3. A poultry house having a room, ventilator sashes arranged near the bottom of the room, means to pivotally support the ventilator sashes near their bottoms so that they may be swung vertically inwardly to a vertically inclined position, guide elements attached to the ventilator sashes and and having vertically elongated openings, upper ventilators arranged above the ventilator sashes, means for pivotally supporting the upper ventilators near their tops so that they may be swung vertically outwardly to a downwardly inclined position, a substantially horizontal rock shaft arranged above the ventilator sashes, depending U-shaped cranks secured to the rock shaft and having substantially horizontal portions pivotally disposed within the elongated openings of the guide elements, crank means connected with the rock shaft and projecting above the same, links connecting the crank means and upper ventilators, and means to turn the rock shaft.

4. In a poultry house, a plurality of pairs of lower ventilator sashes arranged at one side of the house, means to pivotally support each pair of ventilator sashes at their lower ends so that they may be swung vertically inwardly to an open position, a plurality of pairs of upper ventilators arranged above the ventilator sashes, means to pivotally support each pair of upper ventilators at their upper ends so that they may be swung vertically outwardly to an open position, a substantially horizontal rock shaft extending longitudinally of the house and arranged near the ventilator sashes, crank means mounted upon the rock shaft near each pair of ventilator sashes and connected with the ventilator sashes to open and close the same, crank means mounted upon the rock shaft near each pair of upper ventilators and connected with the upper ventilators to open and close the same, a plurality of depending cranks mounted upon the rock shaft in spaced relation, a corresponding number of operating levers pivotally supported between their ends and arranged adjacent to the depending cranks, means pivotally connecting the lower end of each operating lever with the lower end of the corresponding crank, a main rock shaft extending longitudinally within the house, a plurality of cranks mounted upon the rock shaft in spaced relation and corresponding in number and arrangement to the operating levers, links pivotally connecting the last named cranks and operating levers near the upper ends of the operating levers, a lever mounted upon the main rock shaft and being longer than the cranks mounted thereon, and means to move the last named lever.

5. A poultry house having upper and lower stories, a plurality of lower ventilator sashes for each story arranged at one side of the house, means to pivotally support each ventilator sash, a plurality of ventilators for each story arranged above the ventilator sashes and at the same side of the house, the ventilator sashes of the two stories and the ventilators of the two stories forming vertical units, a generally horizontal rock shaft extending longitudinally within the upper story adjacent to the ventilator sashes, depending cranks corresponding in number and arrangement to the ventilator sashes in the upper story and connected with such ventilator sashes and mounted upon the rock shaft, cranks connected with the rock shaft and corresponding in number and arrangement to the ventilators of the upper story, means connecting the cranks with ventilators, generally vertical cranks mounted upon the rock shaft and depending therefrom and arranged in spaced relation thereto, generally vertical operating levers pivotally supported between their ends corresponding in number and arrangement to the generally vertical cranks, means connecting the lower ends of the generally vertical operating levers with the generally vertical cranks, a main operating rock shaft extending longitudinally within the upper story, generally vertical cranks mounted upon the main operating rock shaft, links connecting the last named generally vertical cranks and the upper ends of the operating levers, a lever mounted upon the main operating rock shaft and longer than the cranks carried thereby, means to move the last named lever, a generally horizontal rock shaft extending longitudinally within the lower story near the ventilator sashes, generally vertical cranks mounted upon the last named rock shaft and corresponding in number and arrangement to the ventilator sashes of the lower story and connected therewith, generally vertical cranks mounted upon the last named rock shaft and corresponding in number and arrangement to the ventilators of the lower story, means connecting the last named cranks and last named ventilators, a plurality of generally horizontal cranks mounted upon the first named rock shaft of the upper story, a plurality of generally horizontal cranks mounted upon the rock shaft of the lower story and corresponding in number and arrangement to the generally horizontal cranks of the upper story, and links connecting the generally horizontal cranks of the upper story with the generally horizontal cranks of the lower story.

6. A poultry house having upper and lower stories, a plurality of lower ventilator sashes for each story arranged at one side of the house, means to pivotally support each ventilator sash, a plurality of ventilators for each story arranged above the ventilator sashes and at the same side of the house, the ventilator sashes of the two stories and the ventilators of the two stories forming vertical units, a generally horizontal rock shaft extending longitudinally within the upper story adjacent to the ventilator sashes, depending cranks corresponding in number and arrangement to the ventilator sashes in the upper story and connected with such ventilator sashes and mounted upon the rock shaft, cranks connected with the rock shaft and corresponding in number and arrangement to the ventilators of the upper story, means connecting the cranks with the ventilators, a generally horizontal rock shaft extending longitudinally within the lower story near the ventilator sashes, generally vertical cranks mounted upon the last named rock shaft and corresponding in number and arrangement to the ventilator sashes of the lower story and connected therewith, generally vertical cranks mounted upon the last named rock shaft and corresponding in number and arrangement to the ventilators of the lower story, means connecting the last named cranks and last named ventilators, a plurality of generally horizontal cranks mounted upon the first named rock shaft of the upper story, a plurality of generally horizontal cranks mounted upon the rock shaft of the lower story and corresponding in number and arrangement to the generally horizontal cranks of the upper story, links connecting the generally horizontal cranks of the upper story with the generally horizontal cranks of the lower story, and means to turn one rock shaft.

JOHN D. BURKHOLDER, Jr.

REFERENCES CITED

The following references are of record in the file of this patent:

UNITED STATES PATENTS

| Number | Name | Date |
|---|---|---|
| 631,555 | Billings | Aug. 22, 1899 |
| 1,054,417 | Hutchinson | Feb. 25, 1913 |
| 1,087,913 | Pethick | Feb. 17, 1914 |
| 1,314,892 | Myers | Sept. 2, 1919 |
| 1,515,376 | White | Nov. 11, 1924 |
| 1,654,981 | Long | Jan. 3, 1928 |
| 1,688,836 | Stein | Oct. 23, 1928 |
| 1,903,510 | Laboon et al. | Apr. 11, 1933 |
| 1,983,521 | Cooke | Dec. 11, 1934 |
| 2,336,765 | Adams | Dec. 14, 1943 |
| 2,267,977 | Hunt | Dec. 30, 1941 |

FOREIGN PATENTS

| Number | Country | Date |
|---|---|---|
| 23,999 | Great Britain | 1912 |
| 515,875 | Germany | Jan. 14, 1931 |